(No Model.)  2 Sheets—Sheet 1.
P. M. KLING.
CAR TRUCK.
No. 550,757. Patented Dec. 3, 1895.
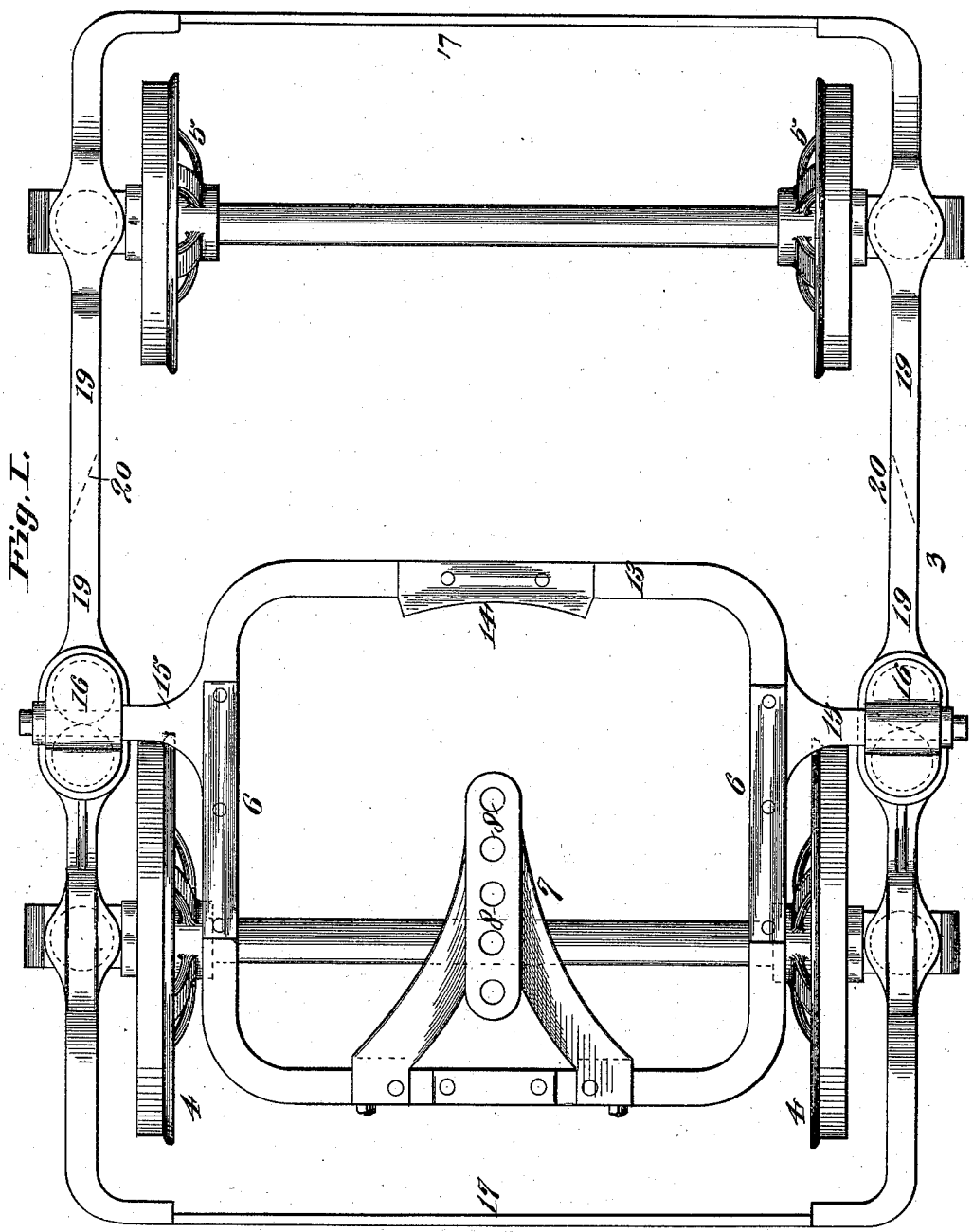
Attest:
Charles Pickles
D. Finly
Inventor:
Peter M. Kling
By Knight Bro
Atty's (No Model.) P. M. KLING. 2 Sheets—Sheet 2.
CAR TRUCK.
No. 550,757. Patented Dec. 3, 1895.
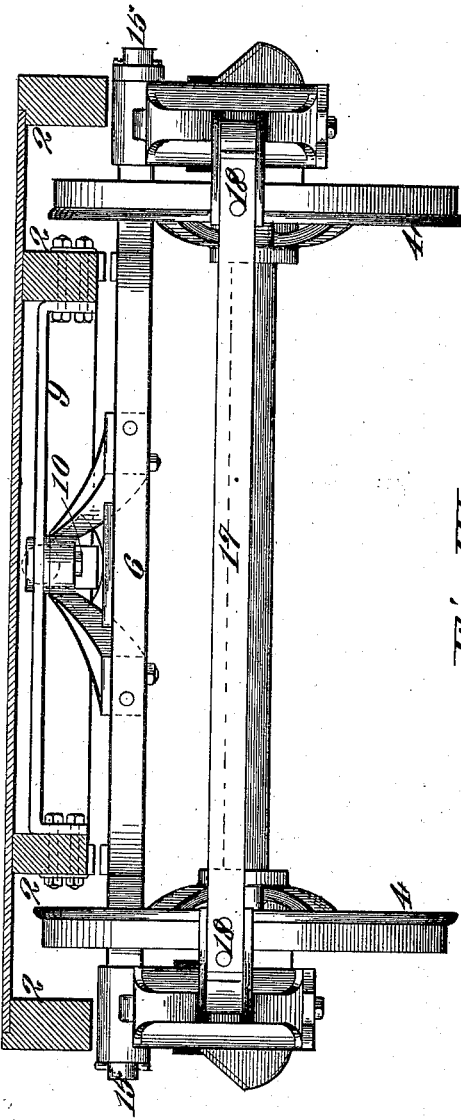
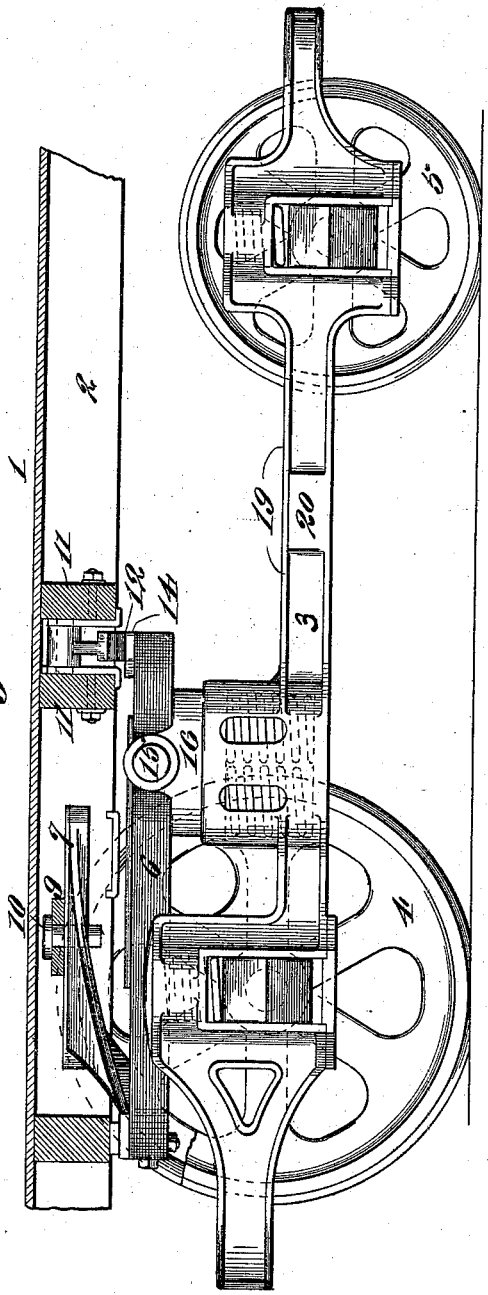

UNITED STATES PATENT OFFICE.

PETER M. KLING, OF ST. LOUIS, MISSOURI.

CAR-TRUCK.

SPECIFICATION forming part of Letters Patent No. 550,757, dated December 3, 1895.

Application filed April 8, 1895. Serial No. 544,882. (No model.)

*To all whom it may concern:*

Be it known that I, PETER M. KLING, of the city of St. Louis, State of Missouri, have invented certain new and useful Improvements in Car-Trucks, of which the following is a full, clear, and exact description, reference being had to the accompanying drawings, forming part of this specification.

My invention relates to certain improvements particularly adapted to street-cars, but which may be used for other cars; and my invention consists in features of novelty hereinafter fully described, and pointed out in the claims.

Figure I is a top or plan view of my improved truck. Fig. II is a transverse section of the car-body and an end view of the truck. Fig. III is a side view of the truck and a detail longitudinal section of the car-body.

Referring to the drawings, 1 represents part of the car-body having the usual timbers 2.

3 represents the truck-frame, 4 the front wheels of the truck, and 5 the rear wheels of the truck.

6 represents the body-supporting frame, located between the truck-frame and the car-body. This frame, as shown in Fig. I, is preferably rectangular in shape, and has secured to its front bar or rail a bracket 7, provided with a number of perforations 8. Secured to the car-body is a bar 9, (see Fig. II,) that is connected to the bracket 7 by means of a pintle or pin 10, that serves as a pivot for the truck, the frame 6 being thus connected to the car-body by means of the bracket 7, the bar 9, and the pin 10. Hinged to the car-body, preferably between cross-timbers 11, (see Fig. III,) is a segment 12, that bears upon the inner end bar 13 of the frame 6, the bar being preferably provided with a bearing-plate 14, (see Fig. I,) that receives the direct impact of the segment. As the truck swings on the pivot 10, the segment 12 rocks back and forth and forms the point of bearing between the car-body and the inner part of the frame 6, and this manner of forming a bearing between the car-body and the frame offers a minimum amount of friction between the two.

The frame 6 has a pivotal connection with the frame 3. This I prefer to make by forming lateral projections 15 on the inner part of the side bars of the frame 6, the ends of these projections having journal-bearings in blocks or boxes 16, that are spring-supported on the frame 3, as shown in Fig. III. This manner of connecting the car-body-supporting frame to the truck-frame permits the latter to swing vertically with relation to the car-body, and in this there is a great practical advantage, particularly when the style of trucks now not uncommonly used that have large front wheels and small rear wheels are employed, in that the rear wheels are not liable to be lifted off of the rails when the car is passing over an uneven or rough track.

There is an advantage in the use of trucks having small rear wheels and forming a pivotal connection between the truck and car-body near the axle of the large front wheels in this that the traction obtained by the large wheels is obtained and at the same time the pivotal action of the truck is not interfered with, though the car-body is comparatively low down, because although the front wheels enter between the sills 2 of the car-body the small wheels are beneath these sills, and the pivotal connection between the car-body and the truck being close to the axle of the front wheels permits a wide range of lateral movement to the rear wheels, while there is but a very slight lateral swinging movement of the front wheels, so that the front wheels are never interfered with by the car-sills, and my manner of forming the pivotal connection between the truck-frame and the car-body-supporting frame avoids any liability of the small rear wheels being removed from the track by the car-body as the car passes over an uneven track, as the inner end of the truck will not be raised or thrown up by the car-body.

It is important with rapid street-car service to have the truck-frame as strong and simple in construction as it can possibly be made. With this object in view I have designed the truck-frame as composed of two end pieces 17, riveted or otherwise secured to the inturned ends of the side pieces, as shown at 18, each side piece being formed of two parts 19, welded together at 20, so that each side piece is practically composed of but a single piece, although it is made up of two parts welded together.

It will be observed that with my improved manner of connecting the car-body-supporting frame to the truck-frame I not only obtain the advantages of a pivotal connection between the two, but the car-body, with its supporting-frame, may be connected to truck-frames of different widths by simply changing the length of the lateral projections 15.

I claim as my invention—

1. The combination of a car-body, a car-body frame having pivotal connection with the car-body, a truck frame independent of the car-body, and a pivotal connection between the truck frame and the car-body frame back of the pivotal connection between the car-body and its frame, substantially as set forth.

2. The combination of a truck frame and a body supporting frame having pivotal connection with the car body, said body supporting frame having lateral projections back of its pivotal connection with the car body, and journal bearings uniting said projections to the truck frame, substantially as set forth.

3. The combination of a truck frame, a body supporting frame, a bracket secured to the body supporting frame and provided with a series of perforations, a cross bar secured to the car body, and a pin adapted to pass through said bar and to fit in said perforations in the bracket to connect the car body to its supporting frame, substantially as set forth.

4. The combination of a truck, frame, a body supporting frame mounted on the truck frame, a bracket secured to the body supporting frame, a pivotal connection between said bracket and car body, and a bearing between the car body and the inner end of the car body supporting frame; said bearing being formed by a segment pivoted to the car body and adapted to bear against the inner bar of said supporting frame, substantially as set forth.

In testimony whereof I have hereunto set my hand this 2d day of April, 1895.

PETER M. KLING.

In presence of—
 GEO. H. KNIGHT,
 W. FINLEY.